Oct. 11, 1938.  W. B. SNYDER  2,133,154
CONTROL SYSTEM
Filed April 21, 1938
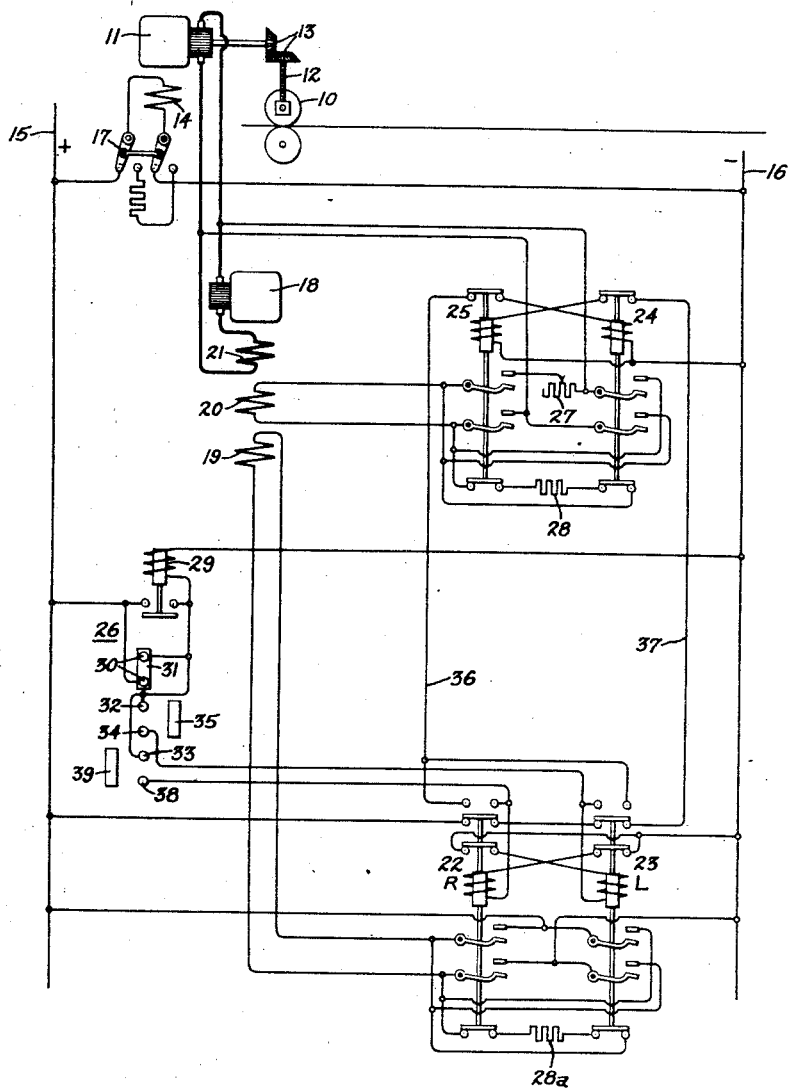
Inventor:
William B. Snyder,
by Harry E. Dunham
His Attorney.

Patented Oct. 11, 1938

2,133,154

UNITED STATES PATENT OFFICE 2,133,154

CONTROL SYSTEM

William B. Snyder, Schenectady, N. Y., assignor to General Electric Company, a corporation of New York Application April 21, 1938, Serial No. 203,279

10 Claims. (Cl. 172—179)

This invention relates to control systems, more particularly to systems for controlling the operations of electric motors, and it has for an object the provision of a simple, reliable, and improved system of this character.

More specifically, the system relates to control systems in which an electric motor is supplied from a generator having a main field winding and a series differential field winding and in which a control device is provided for controlling the stopping of the motor.

In a system of this character the series field winding becomes cumulative during regeneration by the motor, and tends to maintain the generator voltage at a high value so that very little energy can be transferred from the motor and the rotating part of its load to the generator. Consequently, the braking torque is low and a very considerable time is required for the drive to decelerate to rest. Accordingly, a further object of the invention is the provision of means for providing effective regenerative braking of the motor to effect stopping.

In carrying the invention into effect in one form thereof, an electric motor is supplied from a generator having a main field winding and a differential series field winding, and a device is provided for controlling the stopping of the motor together with means responsive to operation of this control device for connecting the main field winding to the armature of the generator for reverse excitation, thereby to provide effective regenerative braking of the motor by maintaining the differential relationship between the field windings during regeneration.

In illustrating the invention in one form thereof, it is shown as embodied in a control system in which an electric motor is employed to operate the screwdown of a rolling mill. The invention has other applications, however, and it is therefore not limited to screwdown control.

For a better and more complete understanding of the invention, reference should now be had to the following specification and to the accompanying drawing, the single figure of which is a simple, diagrammatical representation of an embodiment of the invention.

Referring now to the drawing, a top roll 10 of a pair of thickness reducing rolls is raised or lowered by means of a direct current electric motor 11 to the shaft of which the roll screwdown 12 is connected by means of gearing 13. Motor 11 is provided with a suitable field winding 14 which is supplied from a suitable source, represented by supply lines 15, 16, to which it is connected by means of a switching device 17.

The armature of motor 11 is connected in circuit with the armature of a generator 18 which is driven at a suitable speed that is preferably substantially constant, by suitable driving means (not shown).

Generator 18 is provided with two main field windings 19, 20 and a series field winding 21 that is energized by the current exchanged between the generator 18 and motor 11.

Field winding 19 is excited from a separate source of excitation such as the source 15, 16 to which it is arranged to be connected for excitation in either direction by suitable switching means illustrated as a pair of electromagnetic contactors 22, 23. Field winding 20 is a self-excited shunt field winding and is arranged to be connected to the armature terminals of generator 18 by suitable reversing switching means illustrated as electromagnetic contactors 24, 25. The contactor 24 when operated to its closed position connects the field winding 20 to the terminals of generator 18 for excitation in a direction such that its magnetization is cumulative with the magnetization of separately excited field winding 19. Contactor 25, on the other hand, when operated to its closed position, connects the field winding 20 to the armature terminals of the generator for excitation in the reverse direction, thereby to provide effective regenerative braking of motor 11.

Contactors 22 and 23 are directly under the control of a master switch 26 which is illustrated as having a central or off position and one operative position on each side of the off position. Although a drum type master switch 26 is illustrated for controlling the system, the invention obviously includes the use of an emergency stop button, overload or other protective relay or limit switches for this purpose.

Contactors 24 and 25 are so interlocked with contactors 22 and 23 that when either contactor 22 or 23 is closed, contactor 24 is closed to connect the self-excited field winding 20 to the armature of generator 18 for excitation in a direction that is cumulative with the excitation of separately excited field winding 19, and when both contactors 22 and 23 are open, contactor 25 is closed to reverse the connections of field winding 20.

An adjustable resistor 27 is included in circuit with self-excited field winding 20 when contactor 25 is closed. This adjustable resistor provides control of the braking torque of motor 11. A discharge resistor 28 is connected across self-excited field winding 20 when both contactors 24 and 25 are open during the reversal of the connections of field winding 20 to the armature of generator 18. A similar discharge resistor 28a is connected across separately excited field winding 19 when both contactors 22 and 23 are in their open positions.

An undervoltage relay 29 is provided for the purpose of providing undervoltage protection in case of loss of voltage of the source 15, 16.

With the foregoing understanding of the apparatus and its organization in the completed system, the operation of the system itself will readily be understood from the following detail description: Assuming energization of the buses 15, 16, an energizing circuit is established for the operating coil of undervoltage relay 29 through fingers 30 of master switch 26 bridged by segments 31 in the central or off position of the master switch. Relay 29 closes in response to energization and connects fingers 32 and 33 to the positive side 15 of the supply source.

Assuming that it is desired to lower top roll 10 to decrease the draft, master switch 26 is operated to its right-hand position in which fingers 32, 34 are bridged by segment 35 to complete an energizing circuit for the operating coil of lowering contactor 23 through normally closed interlocks of raise contactor 22 to the negative side 16 of the supply source. Lowering contactor 23 closes in response to energization and connects main field windings 19 to the source 15, 16 for energization in such a direction that generator 18 supplies voltage to motor 11 in the correct direction for lowering top roll 10.

In the closed position of lowering contactor 23 an energizing circuit is established for operating coil of contactor 24 which is traced from finger 34 of the master switch through upper interlock contact of contactor 23, conductor 36, normally closed interlocks of contactor 25, through operating coil of contactor 24 to the negative side 16 of the supply source. Contactor 24 closes in response to energization and connects self-excited field winding 20 to the armature of generator 18 for excitation in a direction that is cumulative with the excitation of separately excited field winding 19. Generator 18 now supplies current to motor 11 in accordance with the well understood characteristics of generators of this character, and the motor 11 rotates in a direction to lower the top roll 10.

When roll 10 has been lowered nearly the desired amount, master switch 26 is operated to its central or off position. This interrupts the energizing circuit of lowering contactor 23 which opens its main contacts to disconnect separately excited field winding 19 from the source 15, 16, and closes its lower auxiliary contacts to connect the discharge resistor 28a across field winding 19. Contactor 23 also opens its upper interlock contacts to interrupt the energizing circuit for contactor 24 which thereupon opens its main contacts to disconnect the self-excited field winding 20 from the armature of generator 18. In the open position of contactor 24 its lower auxiliary contacts complete the connection of discharge resistor 28 across self-excited field winding 20.

In the open position of field contactor 24, an energizing circuit is established for the operating coil of reverse contactor 25. This circuit is traced from the positive side 15 of the supply source through upper intermediate interlock contacts of contactors 22, 23, through conductor 37, interlock contacts of contactor 24 (closed in the open position of the contactor), operating coil of contactor 25 to the negative side 16 of the supply source.

Contactor 25 in responding to energization, opens its lower auxiliary contacts to disconnect the discharge resistor 28 from the field winding 20 and closes its main contacts to connect the self-excited field winding 20 to the armature terminals of generator 18 for excitation in a direction reverse to the direction of its previous excitation.

When separately excited field winding 19 was disconnected from supply source 15, 16, the voltage of generator 18 began to decrease, thereby allowing motor 11 to regenerate and supply current in a reverse direction to generator 18. This reverse flow of current in the armature circuit of generator 18 reversed the excitation of differential field winding 21 so that its action became cumulative with field windings 19 and 20, and thereby tended to prevent decrease of the voltage of generator 18 sufficiently to provide any effective regenerative braking of motor 11.

However, the closing of the main contacts of contactor 25 to reverse the connections of self-excited field winding 20 to the armature of generator 18 reestablishes the differential relationship between field windings 21 and 20.

As a result of the reversal of the excitation of field winding 20, the total flux of generator 18 is reduced rapidly to zero or substantially zero. The exact rate of reduction of the flux of the generator depends of course upon the adjustment of resistor 27. The generated voltage of generator 18 decreases in accordance with the decrease in the flux of the generator and this allows the counter-voltage of motor 11 to force a large current in the armature circuit of the generator 18 and thereby to provide very effective regenerative braking torque which rapidly decelerates the motor to standstill. An important advantage of the invention is that in order to brake the motor to standstill, only a single operation of the control device is required, since no further operation of the control device is necessary to prevent the motor from starting in the reverse direction after it has come to rest. The magnitude of the regenerative braking torque of motor 11 depends upon the adjustment of resistor 27.

If it is desired to raise the top roll 10 to increase the draft between the rolls, the master switch 26 is operated to its left-hand position in which the fingers 33, 38 are bridged by the segment 39 to complete an energizing circuit for the operating coil of raise contactor 22. Contactor 22 closes in response to energization and connects separately excited field winding 19 to supply source 15, 16 for energization in a direction the opposite of that of its previous excitation. From this point on the operation is the same as described in the foregoing with the exception that it takes place in the reverse direction.

Although in accordance with the provisions of the patent statutes the principle of this invention has been explained together with the best mode in which it is now contemplated applying that principle, it will be understood that the apparatus and connections shown in the drawing and described in the specification are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States, is:—

1. A control system comprising in combination a generator having a main field winding and a series differential field winding, an electric motor supplied from said generator, a device for controlling the excitation of said generator to control the stopping of said motor, and means responsive to operation of said control device to stop said motor for connecting said main field winding to the terminals of said generator to reverse the excitation thereof, thereby to provide effective regenerative braking of said motor.

2. A control system comprising in combination an adjustable voltage generator having a main field winding and a series differential field winding, an electric motor connected to be supplied from said generator, a master switch for controlling the stopping of said motor, and means responsive to operation of said master switch for connecting said main field winding to the armature of said generator for reverse excitation thereby to provide effective regenerative braking of said motor.

3. A control system comprising in combination a supply generator having a main field winding and an auxiliary series field winding, an electric motor connected to be supplied from said generator, a master switch having an operative position and an off position, and electromagnetic contactors responsive to operation of said control device to said operative position to connect said main field winding for excitation so that said series winding is differential to said main winding and responsive to operation of said master switch to said off position to connect said main field winding to the armature of said generator to maintain the differential relationship between said field windings during regenerative operation of said motor thereby to provide effective regenerative braking.

4. A control system comprising in combination a generator provided with a main field winding and with an auxiliary differential series field winding, an electric motor connected to be supplied from said generator, a control device for controlling the stopping of said motor, and an electromagnetic contactor responsive to operation of said control device to stop said motor to connect said main field winding to the armature of said generator to maintain the differential relationship between said field windings during regenerative operation of said motor to provide effective regenerative braking.

5. A control system comprising in combination, a generator having a main field winding and a series differential field winding, an electric motor connected to be supplied from said generator, a control device for controlling the stopping of said motor, and switching means responsive to operation of said control device to connect said main field winding to the armature of said generator to maintain the differential relationship between said field windings during regenerative operation of said motor to provide effective regenerative braking torque, and means for controlling the magnitude of said braking torque.

6. A control system comprising in combination an adjustable voltage generator, a main shunt field winding and a series field winding, an electric motor supplied from said generator, a master switch having an operative position and an off position for controlling the starting and stopping of said motor, a contactor responsive to operation of said master switch to said operative position to connect said shunt winding so that said windings act differentially with respect to each other and responsive to operation of said master switch to said off position for disconnecting said shunt winding, a second contactor responsive to operation of said master switch to said off position for reversing the excitation of said shunt winding thereby to provide effective regenerative braking, and means providing a discharge path for said shunt field winding during the transfer of the connections of said shunt winding.

7. A control system comprising in combination a generator having a main field winding and a series differential field winding, an electric motor connected to be supplied from said generator, a master switch having an operative position and an off position for controlling the starting and stopping of said motor, switching means responsive to operation of said master switch to said off position to connect said main winding to the armature of said generator for reverse excitation thereby to provide effective regenerative braking of said motor, and means for controlling the magnitude of the regenerative braking torque.

8. A control system comprising in combination, a generator having a main field winding and a series auxiliary field winding, an electric motor supplied from said generator, a master switch operable to an operative position and to an off position to control the starting and stopping of said motor, contactor means responsive to operation of said master switch to said off positions for interrupting the connections of said main field winding and connecting said main field winding to the armature of said generator for reverse excitation thereby to provide effective regenerative braking of said motor, a discharge resistor and connections from said main winding to said resistor established by said contactor means during the interruption of said connections, and an adjustable resistor connected in said reversed connections by said contactor means for controlling the regenerative braking torque.

9. A control system comprising in combination, a generator having a main field winding and a series auxiliary field winding, an electric motor connected to be supplied from said generator, a master switch operable to an operative position and to an off position to control the starting and stopping of said motor, a contactor responsive to operation of said master switch to said operative position for establishing excitation connections for said main field winding so that said windings act differentially and responsive to operation of said master switch to said off position for interrupting said connections, a second contactor responsive to operation of said master switch to said off position for connecting said main field winding to said generator for reverse excitation to maintain the differential relationship between said field windings thereby to provide effective regenerative braking torque of said motor, and an adjustable resistor in circuit with said main field winding for controlling said braking torque.

10. A control system comprising in combination a generator having a self excited shunt field winding, a separately excited field winding and a series differential field winding, an electric motor supplied from said generator, a master switch having an off position and forward and reverse operative positions, reversing contactors controlled by said master switch for controlling the energization of said separately excited field winding to control the starting and stopping of said motor, a third contactor controlled by said reversing contactors in response to operation of said master switch to one of said operative positions to connect said shunt field winding to said generator so that it acts cumulatively with said separately excited winding, a fourth contactor controlled by said reversing contactors in response to operation of said master switch to said off position for reversing the connections of said self excited field winding thereby to provide effective braking torque of said motor, and an adjustable current limiting device connected in circuit with said self excited field winding by said fourth contactor for controlling said braking torque.

WILLIAM B. SNYDER.